United States Patent [19]

Favreau

[11] 4,389,668
[45] Jun. 21, 1983

[54] HIGH DEFINITION TELEVISION SYSTEM

[75] Inventor: Michel Favreau, Paris, France

[73] Assignee: Thomson-CSF, Paris, France

[21] Appl. No.: 276,998

[22] Filed: Jun. 24, 1981

[30] Foreign Application Priority Data

Jun. 27, 1980 [FR] France ................. 80 14352

[51] Int. Cl.³ ................. H04N 3/34; H04N 5/02
[52] U.S. Cl. ................. 358/83; 358/217; 358/242; 358/140
[58] Field of Search ............ 358/141, 140, 138, 166, 358/217, 242, 83, 133

[56] References Cited

U.S. PATENT DOCUMENTS

| | | | |
|---|---|---|---|
| 2,922,965 | 1/1960 | Harrison | 358/162 |
| 3,200,195 | 8/1965 | Davies et al. | 358/242 |
| 3,743,766 | 7/1973 | Loose et al. | 358/37 |
| 3,792,196 | 2/1974 | Wendland | 358/242 |

FOREIGN PATENT DOCUMENTS

| | | |
|---|---|---|
| 2402102 | 8/1974 | Fed. Rep. of Germany . |
| 1137684 | 6/1957 | France . |
| 2142975 | 2/1973 | France . |
| 758085 | 9/1956 | United Kingdom . |
| 2003698 | 3/1979 | United Kingdom . |

*Primary Examiner*—John C. Martin
*Attorney, Agent, or Firm*—Cushman, Darby & Cushman

[57] ABSTRACT

The present invention relates to a television system using a pickup tube performing an oscillatory scan. On reception the picture restoration device uses a receiving tube which performs a linear restoration, but with a line frequency which is double the scan frequency. In addition, the signal supplied for the pickup tube is processed on reception by two separate processing channels. The two channels respectively supply first and second signals respectively corresponding to the low part and the high part of the receiving tube input signal spectrum. This input signal is then reconstituted by means of an analog mixer. This leads to a much better definition than that obtained with existing television systems.

5 Claims, 3 Drawing Figures

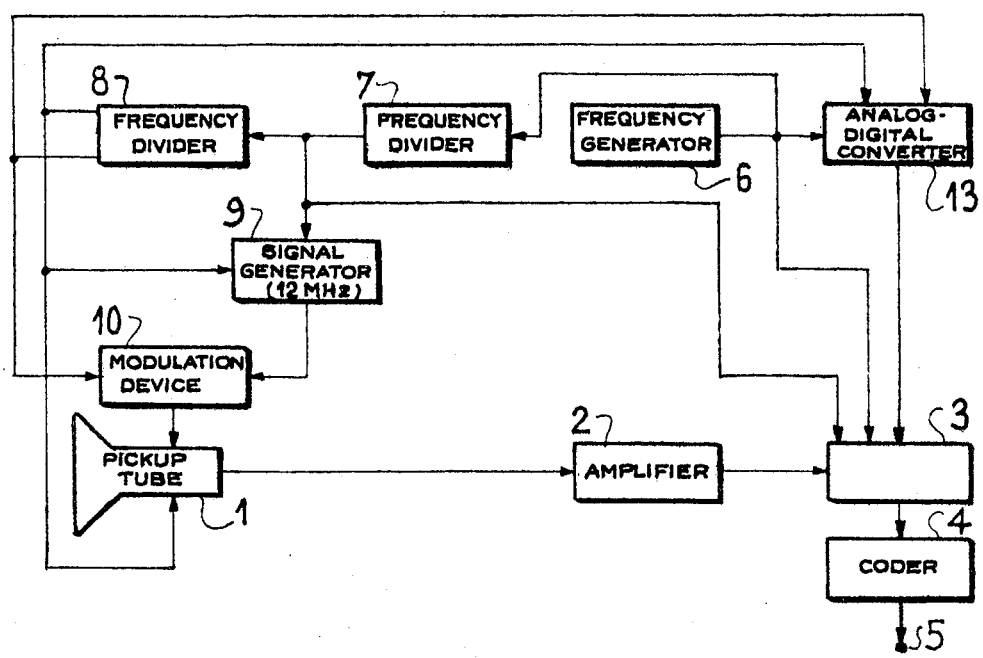

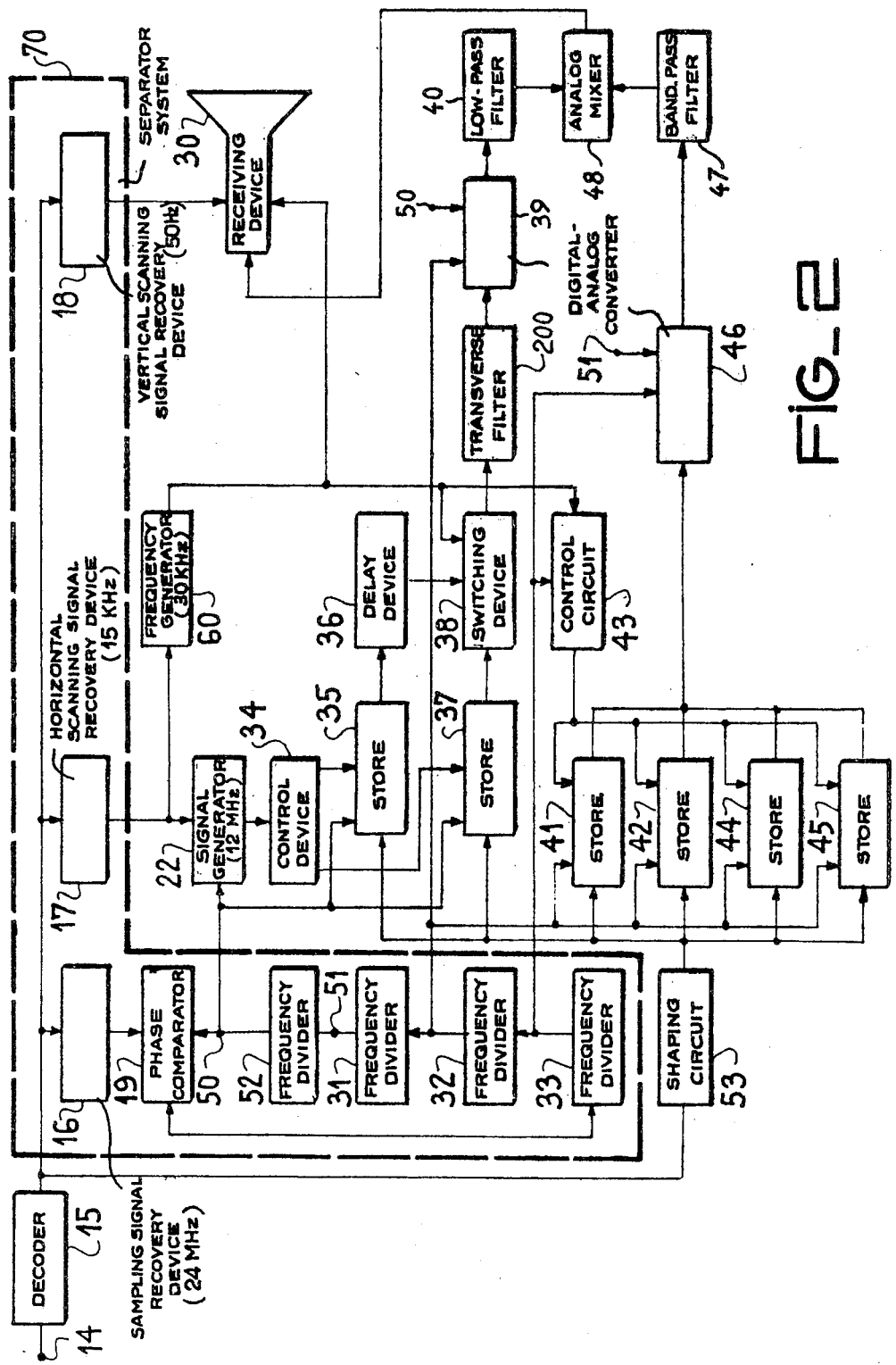
FIG_2

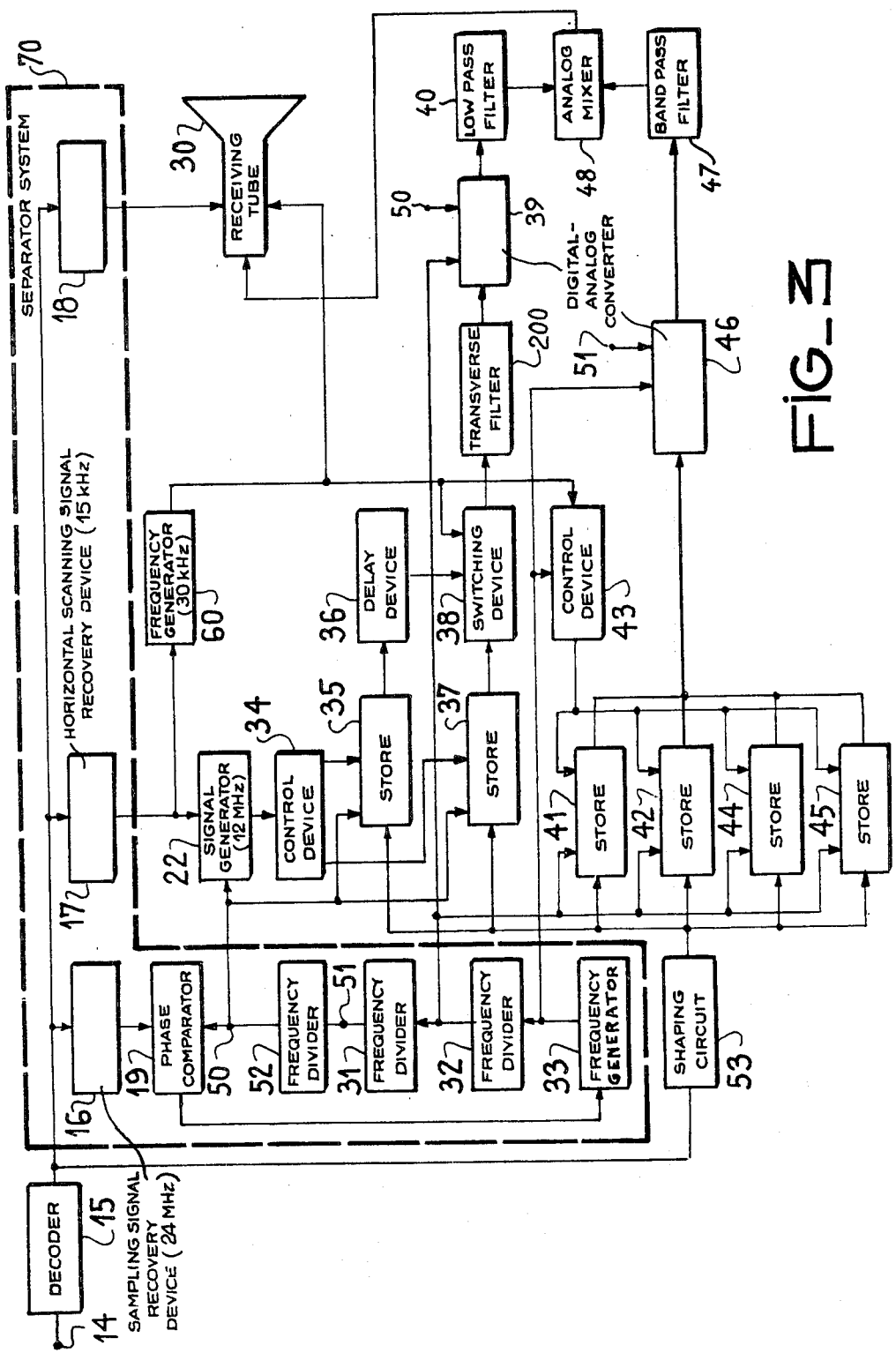

HIGH DEFINITION TELEVISION SYSTEM

BACKGROUND OF THE INVENTION

The present invention relates to television systems comprising on transmission a camera and on reception a picture restoration device.

The presently known television systems are based on the analysis of images by successive lines scanned from top to bottom at a rate of 50 fields per second in Europe and 60 fields per second in the U.S.A. and Japan. In Europe the number of lines per field is 312.5 or 625 lines for two successive fields as a result of a displacement imposed on the vertical scanning from one field to the next. The same principle is used in the U.S.A. with 262.5 lines per field or 525 lines for two successive fields.

Although these systems are perfectly satisfactory and are utilized to the maximum of their possibilities, they are limited from the performance standpoint mainly with regard to definition when compared with cinematographic projection (for 16 and in particular 35 mm films).

Moreover, there is now a demand for watching television pictures on large screens for which the viewing conditions are different (more open viewing angle, average viewing distance approximately three times the diagonal of the screen instead of five) so that it is necessary to increase the definition of the projected pictures.

Large diameter cathode tubes and projectors able to give the necessary definition have been produced (e.g. "eidophor"), but these devices are both costly and cumbersome.

A high definition television system would appear to be necessary for introducing television methods in shooting intended for the cinema. Thus, the technical means developed for television at present make it possible to produce programmes much more cheaply (immediate display during filming), whilst much more sophisticated trick effects are possible.

In the case of conventional systems it is known to improve the subjective quality of pictures in near vision by a low amplitude, very high frequency modulation of the conventional vertical scanning signal of the receiving tube—this frequency being more than twice as high as the highest frequency transmitted. This is intended to fill the gap between the lines, which is prejudicial at short distance. Although this is effective, it does not restore the lack of definition on shooting.

Another known method consists of producing high definition television systems from a simple extrapolation of conventional systems by increasing the number of lines at scan and on reception (e.g. 1250 line television system). However, these extrapolated systems involve the use of an analog pass band or a digital flow rate which are too high to benefit from the advantages of this method.

Television systems are also known (French Patent Application FR-A 2 142 975), whose principle consists of an "oscillatory" instead of a "linear" horizontal scan of the image. For this purpose scanning is carried out by a spot which not only is subject to the standard deviations, but also to an additional deviation, whose frequency is high compared with the frequency of the scanning lines. This supplementary deviation is called spot wobbling and can be carried out with different predetermined wave shapes, namely sine or square waves. On reception such television systems use scanning signals which are identical to those of the scan so that the arrangement of the displayed points is the same as that of the points scanned on transmission. Thus, the definition of the images in the vertical direction is subjectively improved by a staggered engagement of the displayed points (due to the natural tendency of the eye to seek alignments of points in images).

BRIEF SUMMARY OF THE INVENTION

The present invention has for its object a television system producing a much better definition than that obtained with existing systems and using a digital flow rate which is approximately half as high as in the aforementioned directly extrapolated systems. The high definition television system according to the invention also has interesting compatibility characteristics compared with the presently used systems.

The present invention therefore relates to a high definition television system comprising on transmission a camera incorporating a camera or pickup tube having an input supplying a video frequency signal and a first signal generator for generating scanning signals 1H and 1V necessary for the operation of the camera or pickup tube, said signals 1H and 1V producing an "oscillatory" scan having a line frequency $F_L$ and a ripple frequency F, and on reception a picture restoration device incorporating a signal input, a receiving tube having an input, a second signal generator for generating scanning signals 2H and V necessary for the operation of the receiving tube, said signals 2H and 2V producing a "linear" restoration having a line frequency $2F_L$, a first processing channel having an input coupled to the input of the picture restoration device and an output for supplying a first signal corresponding to the low part of the spectrum of the input signal of the receiving tube, a second processing channel having an input coupled to the input of the picture restoration device and an output for supplying a second signal corresponding to the upper part of the spectrum of the input signal of the receiving tube, and an analog mixer having first and second inputs respectively coupled to the output of the first processing channel and to the output of the second processing channel and an output coupled to the input of the receiving tube.

BRIEF DESCRIPTION OF THE DRAWINGS

The invention is described in greater detail hereinafter relative to non-limitative embodiments and the attached drawings, wherein show:

FIG. 1 a diagram of an embodiment of the camera of the television system according to the invention.

FIG. 2 a diagram of the picture restoration device of the television system according to the invention.

FIG. 3 provides a better understanding of the devices described in FIGS. 1 and 2.

DETAILED DESCRIPTION OF THE PREFERRED EMBODIMENTS

In FIG. 1 a pickup tube 1 for taking pictures comprises an output connected to a first input of an analog-digital converter 3 across an amplifier 2. The second and third inputs of this analog-digital converter 3 are respectively connected to the output of a frequency generator 6 and to the output of a standard pulse generator 13.

The output of generator 6 is also connected to the input of generator 13 and to the input of a frequency divider 7. The output of frequency divider 7 is connected to a first input of a modulation device 10 across a signal generator 9, to the input of a frequency divider 8 and to a forth input of the analog-digital converter 3. A first output of the frequency divider 8 is coupled to a first input of the pickup tube 1, to a sync input of signal generator 9 and to an auxiliary input of generator 13. A second output of frequency divider 8 is connected to a second input of modulation device 10 and to a supplementary input of generator 13. The output of modulation device 10 is connected to a second input of pickup tube 1. The output of converter 3 is coupled to a terminal 5 across a coder 4.

Such a camera retains on the one hand a line frequency of 15 KHz and a field frequency of 50 Hz, like the camera of standard 625 line television systems and on the other hand carries out an "oscillatory" scan by adding a modulation device 10 making it possible to modulate the standard vertical scanning signal by a square-wave signal. The amplitude of the square-wave signal is equal to half the line spacing, its frequency being 12 MHz.

The pass band of the video frequency signal supplied by the output of pickup tube 1 according to the invention is raised to 12 MHz, which obviously requires the use of optics and a pickup tube having a corresponding resolving capacity. For digitizing such a signal a sampling frequency of 24 MHz is adequate.

The operation of this camera will be better understood through referring to FIG. 3.

It shows in the form of mixed lines four conventional scan lines 100, 101, 102 and 103 of a pickup tube. Lines 100 and 102 belong to a first field and lines 101 and 103 to a second field. These lines correspond to a so-called "linear" scan.

The unbroken lines represent the scan lines of the pickup tube 1 used in the invention. These lines have the form of a square-wave signal of frequency 12 MHz and correspond to a so-called "oscillatory" scan.

Each unbroken line carries either crosses or black dots which symbolize the digital samples supplied by the analog-digital converter 3. The frequency of the samples is 24 MHz, which corresponds to one sample in each period formed by two consecutive fronts of the rectangular shape associated with the scan lines. The crosses symbolize the samples of the same frame in the same way as the black dots.

For each unbroken scan line letter a designates a dotted line formed by samples placed between a rising front and the following falling front of the square-wave shape, whilst letter b designates a dotted line formed by the samples placed between a falling front and the following rising front, as is necessary for the understanding of the picture restoration device described in FIG. 2.

The camera shown in FIG. 1 operates in the following way. Pickup tube 1 is a spot wobbling tube, i.e. a tube which carries out an oscillatory and not a linear scan. In the present embodiment a square-wave scan is performed. The scanning signals producing such a scan are supplied by a generator constituted by components 6 to 10. Frequency generator 6 supplies a signal, whose frequency is 192 MHz. This frequency corresponds to the frequency at which the bits are supplied by converter 3. On the basis of this output signal from frequency generator 6 frequency dividers 7 and 8 make it possible to obtain a signal at frequency 24 MHz, which is the sampling frequency of the analog-digital converter 3, and conventional vertical and horizontal scanning signals, whose frequencies are respectively 50 and 15 kHz. The signal with a frequency of 24 MHz is present at the output of divider 7. The signals with frequencies of 15 and 50 kHz are respectively present at the first and second outputs of divider 8.

Signal generator 9 generates synchronously with the horizontal scanning signal a square-wave signal of frequency 12 MHz and with an amplitude equal to half the line spacing. The modulation device 10 then performs a modulation of the conventional vertical scanning signal by this square-wave signal.

The scanning signals applied to the pickup tube 1 are constituted by the conventional horizontal scanning signal and the vertical scanning signal resulting from the modulation performed by device 10. These signals produce a square-wave "oscillatory" scan represented by the unbroken lines in FIG. 3.

The video frequency signal supplied by pickup tube 1 is amplified by amplifier 2 and is then converted into digital samples by converter 3. The sampling frequency of converter 3 is 24 MHz (this frequency being supplied by divider 7) and each digital sample is constituted by 8 bits. The frequency of the bits supplied by converter 3 is consequently 192 MHz (this frequency is supplied by generator 6).

Generator 13 supplies pulses used for synchronizing converter 3 so as to ensure that one sample (crosses and black dots in FIG. 3) is supplied for each interval formed by two successive fronts of the square-wave shape associated with the scan lines.

The bits supplied by the analog-digital converter 3 are then transmitted to terminal 5 after coding by coder 4. This coding is appropriate for the transmission line by which the binary data are transmitted to the picture restoration device.

On reception, after decoding and digital-analog conversion of the transmitted data, the picture produced on the screen of a receiving tube having conventional scanning signals has a definition which is twice as high in the horizontal direction as in the vertical direction.

However, it is possible to further improve the performances of the definition of pictures on reception because the high frequencies of a video frequency signal almost always correspond to very long vertical transitions and that under these conditions there is a very considerable information redundancy between successive lines. Thus, it is possible to make high frequencies and only these coincide on two successive lines, whilst still retaining a complete separation of the lower frequencies. The definition of the horizontal lines (in the vertical direction) is therefore completely retained and the definition of the vertical lines (in the horizontal direction) is improved. This is the function of the picture restoration device of FIG. 2.

This device carries out a scan of the receiving tube along 1250 lines and comprises two separate processing channels. These two channels make it possible to simultaneously process a stream of data transmitted by a camera like that described in FIG. 1 and to respectively supply the lower part and upper part of the spectrum of the video frequency signal.

The lower part of the spectrum is obtained by using for each scan or analysis line of the picture, every other sample for a first scanning line of the receiving tube and the remaining samples for a second scanning line thereof. The upper part of the spectrum is obtained by repeating the samples of the same scan or analysis line for two consecutive scanning lines of the receiving tube and then filtering them.

In FIG. 2 a terminal 14 for receiving a binary data stream characterizing luminance information is connected to the input of a decoder 15. This data stream is assumed to have been transmitted by a camera like that described in FIG. 1.

The output of decoder 15 is coupled to the input of a 24 MHz sampling frequency recovery device 16, to the input of a conventional horizontal scanning signal (15 kHz) recovery device 17 and to the input of a conventional vertical scanning signal (50 Hz) recovery device 18.

The output of device 16 is connected to a first input of a phase comparator 19, whereof a second input is coupled to the output of a frequency generator 33 across frequency dividers 52, 31 and 32 arranged in series. The output of phase comparator 19 is connected to the input of a frequency generator 33.

The output of device 17 is connected to the sync input of a signal generator 22, whose input is connected to the output of frequency divider 52.

The output of decoder 15 is coupled across a shaping circuit 53 to each of the inputs of six stores 35, 37, 41, 42, 44 and 45. The output of signal generator 22 is connected to the input of a control device 34, whereof first and second outputs are respectively connected to a storage control input of store 35 and to a storage control input of store 37.

The output 50 of frequency divider 52 is connected to the reading control input of stores 35 and 37. The output of frequency divider 32 is connected to a first control input of stores 41, 42, 44 and 45, whereof a second control input is connected to the output of a control circuit 43. The output of store 35 is connected to a first input of a switching device 38 across a delay device 36. The output of store 37 is connected to a second input of switching device 38, whereof the output is connected to the input of a transverse filter 200. The output of transverse filter 200 is coupled to the input of a low pass filter 40 across a digital-analog converter 39. The output of low pass filter 40 is connected to a first input of an analog mixer 48, whose second input is coupled to the output of a digital-analog converter 46 across a band pass filter 47. The input of digital-analog converter 46 is connected to each of the outputs of stores 41, 42, 44 and 45.

The digital-analog converter 39 comprises two control inputs respectively connected to the output of frequency divider 32 and to the output 50 of frequency divider 52. The digital-analog converter 46 in the same way comprises two control inputs respectively connected to the output of frequency generator 33 and to the output 51 of the output 31.

The output of analog mixer 48 is connected to a first input of a receiving tube 30, whereof a second input is coupled to the output of device 17 across a frequency generator 60.

A third input of the receiving tube 30 is connected to the output of device 18. The output of frequency generator 60 is coupled to each second control input of stores 41, 42, 44 and 45 across control device 43, whereof an auxiliary input is connected to the output of frequency generator 33. Finally a switching control input of switching device 38 is connected to the output of frequency generator 60.

Devices 16, 17, 18, phase comparator 19, dividers 32, 31 and 52 and frequency generator 33 constitute a separating assembly 70.

The picture restoration device operates in the following way. Devices 16, 17 and 18, which are common to all the picture restoration devices make it possible, after decoding the data stream by decoder 15, to respectively recover a signal at the 24 MHz sampling frequency and the conventional horizontal scanning signal of frequency 15 kHz and vertical scanning signal of frequency 50 Hz.

Generator 33 supplies a signal at frequency $F'_B$ equal to 384 MHz. The signal supplied by frequency dividers 32, 31 and 52 are respectively at frequencies 192, 48 and 24 MHz. Phase comparator 19, frequency generator 33 and dividers 31, 32 and 52 constitute the control means for controlling the output signal from divider 52 relative to the signal at frequency 24 MHz supplied by device 16. On the basis of this signal signal generator 22 supplies a square-wave signal at frequency 12 MHz synchronized with the horizontal scanning signal supplied by device 17.

The vertical and horizontal scanning signals from receiving tube 30 are respectively the conventional signal of frequency 50 Hz supplied by device 18 and an auxiliary signal supplied by generator 60, which is synchronous with the conventional signal supplied by device 17. The frequency of the auxiliary signal is 30 kHz, which is double the conventional horizontal scanning signal frequency. Thus, the number of scanned lines on the receiving tube screen is 1250 for two fields.

Moreover, the present picture restoration device comprises two processing channels for the data supplied by the shaping circuit 53. One comprises stores 35, 37, delay device 36, switching device 38, digital-analog converter 39 and low pass filter 40.

The signals controlling the writing into stores 35 and 37 are supplied by control device 34. The latter is associated with generator 22 and respectively supplies at its two outputs a signal for controlling the writing in store 35 between a rising front and the following falling front of the square-wave signal supplied by generator 22 and a signal controlling the writing into store 37 between a falling front and the following rising front of said same square-wave signal, which in both cases corresponds to the storage of alternate samples.

On taking, for example, line 100 in FIG. 3, store 35 stores the digital samples corresponding to line 100a and store 37 the digital samples corresponding to line 100b. These digital samples are then read into these two stores at a frequency of 24 MHz. The reading time for the samples of a scan line contained in each store is 32 μs (corresponding to one signal period at a frequency of 30 kHz). Those supplied by store 35 are delayed by 32 μs by delay device 36.

For line 100, for example, switching device 38 supplies, at the frequency 24 MHz, the digital samples corresponding to line 100a (read into store 35) which takes 32 μs, then the digital samples corresponding to line 100b (supplied by delay device 36), which in the same way takes 32 μs.

However, as a result of sampling alternate samples for forming two lines (for a 1250 line scan) from a line obtained from a 625 line scan, in actual fact represents an under-sampling of the video band to be transmitted. However, this under-sampling generates spurious frequencies or aliasing. These spurious frequencies can easily be eliminated by transverse spatial digital filtering using a linear combination of samples close to the missing sample. This filtering leads to an attenuation of several dozen decibels on the new sampling frequency Fech/2, on half this frequency Fech/4 and on all parts of the spectrum between these two frequencies. Such a filtering operation is carried out by filter 200 on samples supplied by switching device 38.

Digital-analog converter 39 then converts the samples supplied by filter 200 into an analog signal. Converter 39 is associated with low pass filter 40, whose cut-off frequency of 12 MHz is adequate for restoring all the data contained in the corresponding part (0 to 6 MHz) of the spectrum of the luminance signal of the initial video frequency signal.

The signal obtained at the output of filter 40 permits receiving tube 30 to reproduce horizontal transitions (in the vertical direction) just as well as if there had been a 1250 line scan during shooting. This is due to the displacement of alternate samples at the time of scan.

The other processing channel comprises stores 41, 42, 44 and 45, control circuit 43, digital-analog converter 46 and filter 47. This channel covers the digital samples of the lines followed by letters a and b (FIG. 3) which correspond to the same scan line. In view of the fact that the initial 625 scan lines (in unbroken lines in FIG. 3) lasting 64 µs are, on reception, transformed into 1250 32 µs lines, the duration of each bit stream corresponding to each scan line (in unbroken line form) is compressed in a ratio of 2 by means of digital stores 41, 42, 44, 45, whose reading frequency (384 MHz) is twice as high as that of the writing frequency. Each bit stream corresponding to a scan line is read twice before being converted into analog form by converter 46. Control circuit 43 makes it possible to successively read at frequency 384 MHz the bits stored in memories 41, 42, 44, 45.

We will take, for example, the scan line 100 in FIG. 3. All the bits corresponding to this scan line are stored at frequency 192 MHz in stores 41 and 42 for example. The duration of this storage operation is 64 µs.

For the following line 101 stores 41 and 42 are successively read at frequency 384 MHz. This reading operation lasts 64 µs. During this reading operation the digital samples corresponding to line 101 are stored in stores 44 and 45. The process resumes with the following line 102. Thus, each initial scan line (in unbroken line form) is replaced by two lines comprising all the samples placed on an initial scan line.

The digital-analog converter 46 converts the binary flow rate received at its input as if it were a succession of samples at 48 MHz, but filter 47 only samples that part of the spectrum between 12 and 24 MHz before combining this spectrum with that of the first channel by means of analog mixer 48.

In such a picture restoration device the definition of the horizontal patterns (in the vertical direction) is as satisfactory as if there had been a 1250 line scan (spectrum 0–6 MHz) and the definition of the vertical patterns (in the horizontal direction) corresponds to the definition obtained with standard 625 line television systems using the 24 MHz sampling frequency.

The processing of digital samples by the second channel is justified by the fact that the high frequencies of a video signal always correspond to very long vertical transitions and that under these conditions there is a very significant information redundancy between successive lines.

It should be noted that the television system according to the invention constituted by a camera and a picture restoration device as shown in FIGS. 1 and 2 makes it possible:

to retain a 625 line time base for the cameras,
to reduce the digital flow rate by half compared with a true 1250 line television system,
to effect a reproduction on 1250 lines with a complete horizontal resolution (in the vertical direction),
to reproduce on all the lines the points corresponding to the high frequencies by bringing about coincidence between two image points in the vertical direction,
and to be completely compatible with the standard 625 line television system.

The invention is not limited to the embodiments described and represented. In particular the system according to the invention has been described in the basis of a luminance signal, but it is also applicable to each of the colour difference components of a standard TV colour signal, with, however, different sampling frequencies and filtering band widths.

In the same way it could be applied to a luminance signal in accordance with criteria other than those of the 625 line television system used in exemplified manner.

What is claimed is:

1. A high definition television system comprising on transmission a camera incorporating a camera or pickup tube having an input supplying a video frequency signal and a first signal generator for generating scanning signals 1H and 1V necessary for the operation of the camera or pickup tube, said signals 1H and 1V producing an "oscillatory" scan having a line frequency $F_L$ and a ripple frequency F, and on reception a picture restoration device incorporating a signal input, a receiving tube having an input, a second signal generator for generating scanning signals 2H and V necessary for the operation of the receiving tube, said signals 2H and V producing a "linear" restoration having a line frequency $2F_L$, a first processing channel having an input coupled to the input of the picture restoration device and an output for supplying a first signal corresponding to the low part of the spectrum of the input signal of the receiving tube, a second processing channel having an input coupled to the input of the picture restoration device and an output for supplying a second signal corresponding to the upper part of the spectrum of the input signal of the receiving tube, and an analog mixer having first and second inputs respectively coupled to the output of the first processing channel and to the output of the second processing channal and an output coupled to the input of the receiving tube.

2. A television system according to claim 1, wherein the camera comprises an analog-digital converter for supplying digital samples of the video frequency signal supplied by the pickup tube, the sampling frequency of said converter being 2F and wherein the first processing channel comprises a processing circuit having an input coupled to the input of the picture restoration device and an output, said processing signal serving to process the digital samples of the signal supplied by the pickup tube in such a way that the contribution of said first channel to the processing of the input signal of the receiving tube brings about, for each scanning line of the receiving tube, the restoration of alternating points of an analysis or scan line, and for two consecutive scanning lines of the receiving tube the restoration of all the points of an analysis or scan line, a digital-analog converter having an input coupled to the output of the processing circuit and an output, as well as a low pass filter having an input coupled to the output of the digital-analog converter and an output coupled to the first input of the analog mixer.

3. A television system according to claim 1, wherein the camera comprises an analog-digital converter for supplying digital samples of the video frequency signal supplied by the pickup tube, the sampling frequency of the converter being 2F and wherein the second processing channel comprises a processing circuit having an input coupled to the input of the picture restoration device and an output, said processing circuit serving to compress the duration of the digital sample sequence corresponding to each analysis or scan line and to repeat said compressed sample sequence twice in such a way that the contribution of this second channel to the processing of the input signal of the receiving tube brings about, for each scanning line of the receiving tube, the restoration of all the points of an analysis or scan line, said restoration taking place on two consecutive scanning lines of the receiving tube; a digital-analog converter having an input coupled to the output of the processing circuit and an output; and a band pass filter having an input coupled to the output of the digital-analog converter and an output coupled to the second input of the analog mixer.

4. A television system according to claim 2, wherein the processing circuit comprises a first and a second digital store having identical writing and reading frequency for storing all the samples corresponding to an analysis or scan line, the writing into the store being controlled so that each store stores a digital sample in turn, each store having an input coupled to the input of the picture restoration device and an output; a delay device with a delay equal to $\frac{1}{2}F_L$ having an input coupled to the output of the first store and an output; a switching device having first and second inputs respectively coupled to the output of the delay device and to the output of the second store and an output; and a transverse filter having an input coupled to the output of the switching device and an output coupled to the input of the digital-analog converter.

5. A television system according to claim 3, wherein the processing circuit comprises k digital stores (k equals integer), each having an input coupled to the input of the picture restoration device, an output coupled to the input of the digital-analog converter and a reading control input, the reading frequency of said stores being twice as high as the writing frequency; and a control device having an output coupled to each of the control inputs of the stores for alternatively controlling the reading.

* * * * *

UNITED STATES PATENT AND TRADEMARK OFFICE
CERTIFICATE OF CORRECTION

PATENT NO. : 4,389,668
DATED : June 21, 1983
INVENTOR(S) : Favreau

It is certified that error appears in the above—identified patent and that said Letters Patent is hereby corrected as shown below:

Column 5, line 36, delete "circuit" and insert --device--.

Column 7, line 34, delete "circuit" and insert --device--.

Figure 1, block 13, label --PULSE GENERATOR--;

block 3, label --ANALOG-DIGITAL CONVERTER--.

Figure 3, block 18, label --VERTICAL SCANNING SIGNAL RECOVERY DEVICE (50 HZ)--

Signed and Sealed this

Eighteenth Day of September 1984

[SEAL]

Attest:

GERALD J. MOSSINGHOFF

Attesting Officer

Commissioner of Patents and Trademarks